Patented Dec. 9, 1952

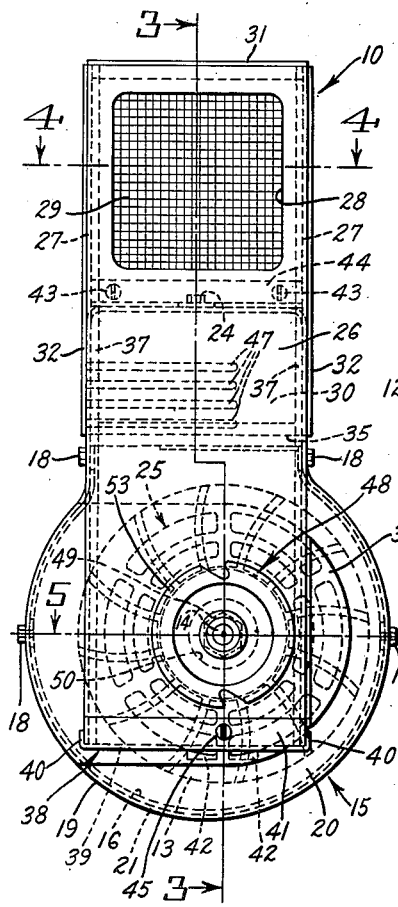

2,620,782

UNITED STATES PATENT OFFICE 2,620,782

AIR INTAKE STACK FOR AIR-COOLING OF INTERNAL-COMBUSTION ENGINES

Henry J. Stegeman, Fairfield, Conn., assignor to The Locke Steel Chain Company, Bridgeport, Conn., a corporation of Connecticut Application November 29, 1949, Serial No. 130,015

6 Claims. (Cl. 123—41.65)

1

This invention relates to new and useful improvements in means for excluding dust, grass clippings, etc. from the air intake of the motors of power driven lawn mowers and the like, and has particular relation to certain improvements over the structure disclosed in my Patent 2,172,- 992 of September 12, 1939.

As pointed out in that patent, where the fan intake for air cooled gasolene motors in a lawn mower or similar machine is positioned relatively close to the ground and near the cutting reels of the lawn mower, the dust stirred up by the mower and the flying grass clippings from the reels of the mower are drawn toward such intake and either enter the same and clog up the cooling fins of the motor or where such entrance is covered by a screen the grass clippings soon clog the screen. The result in either case is overheating and damage to the motor.

According to the present invention the motor of a lawn mower or the like is provided with a casing also enclosing the blower fan. There is an air intake to the fan through which extends the shaft of a starting pulley for the motor. Closing such air intake opening and located between said casing and the pulley and about the shaft of the latter is my improved stack whereby the only air admitted to such intake opening of the motor casing is supplied from a relatively high level or a position above the motor and transmitted through a closed conduit, whereby grass clippings and the like are not drawn into or against the motor casing.

Another advantage of the mentioned structure is that the starting pulley of the motor is constantly exposed and ready for use and it is not necessary to open a casing or move any parts, etc. in order that access be had to the starting pulley.

It is a further object of the present invention to provide a simple and inexpensive mounting for an air intake stack of novel construction all in combination with the casing of the motor or internal combustion engine of a power driven lawn mower or the like.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

2

In the drawing:

Fig. 1 is a front elevational view showing the assembly of the motor casing and the stack of the invention;

Fig. 2 is a side elevational view taken as looking from the left in Fig. 1, a part of the casing and motor being broken away;

Fig. 3 is a sectional view of the casing and stack, the view being taken as along the line 3—3 of Fig. 1;

Fig. 4 is a view partly in plan and partly in transverse section, the section being along the line 4—4 of Fig. 1;

Fig. 5 is a sectional view of the stack and adjacent portions of the motor casing, the view being taken along the line 5—5 of Fig. 1; and Fig. 6 is a perspective view showing the bottom tray-like portion or closure of the present stack.

Referring in detail to the drawing, at 10 is generally indicated my improved stack, the same being shown as mounted on the sheet metal casing 11 of a gasolene motor or internal combustion engine 12 including a blower 13 from which extends a threaded cranking shaft 14. Closing a side of the casing 11 and enclosing the blower 13 is a sheet metal casing extension 15. A plate 16 closes one side of the lower portion of casing 11, at the inner side of the blower 13, being held in place by bolts 17.

Attached to the casing 11 and plate 16 is the casing 15, the same being secured in place as by bolts 18. This casing 15 includes a lower circular portion 19 and comprises a front wall 20 and continuous side and bottom wall 21. The rear side of the lower circular portion of the casing 15 is fully closed by the plate 16 while its upper side fits in telescopic relation with a flange portion 22 of the casing 11.

A nut 23 is welded to the inner side of an edge portion of the flange 22 and into this nut there is threaded a bolt 24 which serves the purpose of the bolts 18 and then an additional purpose which will be set forth. The mid portion of the front wall 20 of the casing extension 15 is perforated providing a grill structure 25 indicated by dotted lines in Fig. 1 and by full lines in Fig. 5. Through the center of this grill structure the cranking shaft 14 extends.

Stack 10 comprises a generally rectangular structure including integral front and side walls 26 and 27 extending for the length of the stack and which front wall 26 toward its upper end is provided with a relatively large opening 28 over which is mounted a screen 29. Additionally, the stack includes an upper rear portion also comprising a one-piece structure including a rear wall 30, a top wall 31 and narrow side wall portions 32. This back wall or rear wall 30 is also provided with a relatively large opening 33 preferably in the assembled stack located opposite the opening 28 in the wall 26 of the front wall of the stack and opening 33 is covered by a screen 34.

The back wall 30 is much shorter than the front wall 26 of the stack and as here disclosed, stops at the point 35. This leaves the lower rear side of the stack open and such open side is disposed over the grill 25 in the wall 20 of casing extension 15. The stack is of less width than the diameter of such grill opening and the stack on one side is provided with a flange-like portion 36 whereby such opening is entirely closed by the stack. The side walls 27 of the front section of the stack have their inner edges bent into opposing relation providing narrow flanges 37 forming strengthening elements and also presenting flat surfaces to be disposed against the wall 20 of the casing extension 15.

In addition to the elements above set forth, the stack 10 comprises a lower closure in the form of a tray-like part generally designated 38 and including a bottom wall 39, short side walls 40, a short front wall 41 and a pair of depending hooks or lugs 42 at the inner edge of its bottom wall. Additionally, fastened to the rear wall 30 of the stack as by rivets or the like 43 is a bracket or plate 44 disposed at right angles to such wall.

The stack 10 is mounted on the casing extension 15 of the motor and to accomplish this, the hooks 42 of the bottom piece 38 are hooked or passed through bottom portions of the openings of the grill 25. Then the lower end of the stack is slipped into the tray with the walls 40 and 41 of the latter about the outer sides of the side and front walls of the stack and the parts secured together as by a bolt 45. Such bolt may be threaded into a nut 46 welded to the inner surface of the lower portion of the front wall 26 of the stack. The tray or closure 38 thus locates the stack and in addition fully closes the lower end of the latter.

Now the bolt 24 is passed through an opening in the free end portion of the plate or bracket 44 and through an opening in the top wall adjacent the open side of the casing extension 15 through the casing flange 22 and threaded into the welded nut 23 above referred to. Towards the upper end of the front wall 20 of the casing extension 15 corrugations or ribs 47 are formed and the inner wall 30 of the casing is held against these providing a resilient action and a rigid structure whereby the stack is held against vibration or movement.

It is noted that the stack is mounted on the casing extension 15 merely through the use of the hooks 42 and the bolt 24. Thus, it will be understood that the closure or tray 38 may be secured to the stack and then the assembly mounted on the casing extension 15 by passing the hooks 42 through lower portions of the open grill structure 25 and then swinging the stack into vertical position to locate the bracket or plate 44 for passage of the bolt 24. With the stack in place, the openings through the grill 25 are all closed to atmosphere except through the stack.

A starting pulley 48 having a relatively long hub 49 is positioned. This pulley has its hub threaded onto the threaded starting shaft 14 and the hub 49 of the pulley is of such length that the pulley itself is located at the outer side of the front wall 26 of the stack. Thus, as shown, hub or shaft 49 of the pulley passes transversely through the stack, an opening 50 being provided in the wall 26 for this purpose. Hub 49 is preferably hex or other angular or flat sided shape to be engaged by a wrench or the like.

While the pulley and hub 49 might be in one piece in the present structure, the pulley is provided with an internal hub-like portion 51 into which the outer end of the hub 49 is threaded. Further, it is noted that this pulley 48 includes an inner flange 52 as well as the outer flange 53 and it will be understood that when the motor 12 is to be started a starting rope is wrapped about a pulley for spinning the same, thus cranking the motor. The inner flange 52 of the pulley 48 serves to prevent the starting rope from becoming wedged between the pulley and the front wall 26 of the stack.

With the structure described, it will be clear that the only entrance of air into the casing about the motor is through the grill 25. Therefore, since the stack 10 is closed except through the screens 29 and 34 and through its lower rear portion fitting against the grill, all air being drawn by the fan 13 and blown about the motor comes in through the screens 29 and 34 which are elevated above the motor air intake of casing extension 15. Thus, these screens are not in the zone which is filled with flying grass clippings, dust and the like thrown up by the cutting reels of the lawn mower and the cooling air taken into the motor casing is generally free of dust and dirt and all grass clippings, the latter in any event being excluded by the screens 29 and 34.

It is noted that with the present structure the starting pulley 38 is always in position for use. It is not necessary to raise or move any part of the stack to gain access to this starting pulley and therefore it is not necessary that the operator bear in mind any necessity for returning the stack to its position closing the air intake of the engine casing.

From the foregoing it will be understood that the present stack is of simple and inexpensive construction; that it is mounted on the motor casing with a minimum of effort and requirement for parts; and that with my improved construction the starting pulley is constantly exposed, ready for use, and there is no occasion for disturbing the location of the stack or the moving of the stack in any such manner as would require the attention of the operator to make sure that the stack was returned to the proper position before a lawn mower, the engine of which is equipped with the stack, is again used.

Having thus set forth the nature of my invention, what I claim is:

1. In combination with an internal combustion engine provided with a casing having an air intake opening in a side wall thereof and having a cranking shaft aligned with such air intake opening, an air intake stack having front and rear walls and an opening through its rear wall toward its lower end and having such opening disposed over said air intake, said stack having screened air entrances in its front and rear walls toward its upper end, hook-like lugs on the lower portion of said stack and hooked over the lower edge of the air intake opening of the motor casing and supporting said stack against downward movement and with the opening through the rear wall of the stack against said air intake opening, a rigid bracket fixed with the rear wall of said stack and fastened to such motor casing in vertically spaced relation to said air intake opening therein, a pulley, a long hub rigid with said pulley and passing through said stack and connected with said cranking shaft, and said pulley located at the forward side of the front wall of said stack above the lower end of the latter whereby the pulley is at all times exposed for use in starting the engine and may be used to crank the engine without shifting of said stack.

2. The combination with an internal combustion engine provided with a casing having an air intake opening in a side wall thereof and having a starting pulley, an elongated air intake stack having its lower portion covering said air intake opening, said stack having a screened air entrance toward its upper end and open through its lower inner side portion whereby through the stack said air entrance communicates with said air intake opening, means rigidly mounting said stack on said casing, said starting pulley having a shaft extending through said stack and said air intake opening and connected with said engine for cranking the same, and said starting pulley rigid with the outer end of said shaft and located at the outer side of the front of said stack whereby to have it at all times exposed for use without shifting of said stack.

3. The combination with an internal combustion engine provided with a casing having an air intake opening in a side wall thereof and having a cranking shaft aligned with such air intake opening, an elongated air intake stack having front and rear walls and an opening through its rear wall toward its lower end and having such opening over said air intake opening, said stack having a screened air entrance toward its upper end whereby through the stack said air entrance communicates with said air intake opening, hook-like lugs on the lower portion of said stack and passing through such air intake opening below said cranking shaft and resting on the lower edge portion of said air intake opening and supporting the stack, a rigid bracket fixed with the upper portion of said stack and rigidly fastened to said motor casing in vertically spaced relation to said air intake opening, a pulley, a long hub rigid with said pulley and passing through said stack and connected with said cranking shaft, and said pulley located at the forward side of the front wall of said stack above the lower end of the latter whereby the pulley is at all times exposed for use in starting the engine and may be used to crank the engine without moving said stack.

4. The combination with an internal combustion engine provided with a casing having an air intake opening in a side wall thereof and having a starting pulley, an elongated air intake stack having its lower portion covering said air intake opening, said stack having a screened air entrance toward its upper end and open through its lower inner side portion whereby through the stack said air entrance communicates with said air intake opening, means rigidly mounting said stack on said casing, said starting pulley having a shaft extending through said stack and said air intake opening and connected with said engine for cranking the same, said starting pulley rigid with the outer end of said shaft and located at the outer side of the front of said stack whereby to have it at all times exposed for use without shifting of said stack, and said pulley comprising a double flanged pulley having one flange parallel with and closely adjacent the front wall of said stack and serving to prevent a starting rope from entering between the pulley and said wall.

5. An air intake stack for the internal combustion engine of a lawn mower and the like, said stack comprising a closed relatively flat elongated transversely rectangular hollow body having inner and outer sides of which the inner side is to have its lower end portion disposed against the casing of an engine, said body having screened air entrance openings opposite one another in the respective inner and outer sides of the upper end portion thereof, said body having a discharge opening through the inner side of its lower end portion for discharging into the air intake of the casing of an internal combustion engine, a hook-like lug on the inner side of the lower end portion of said body below said discharge opening and extending in the direction of the length of said body for use in mounting the same on an engine casing, and a rigid mounting bracket fixed to said body and extending inwardly of the plane of said inner side of said body above said discharge opening for attachment to an engine casing above the air intake thereof.

6. An intake stack for the internal combustion engine of a lawn mower and the like, said stack comprising a relatively flat elongated transversely rectangular body open through its lower end, a detachable closure on said lower end of said body, said closure including a bottom wall closing said end of the body and end and front wall portions embracing the lower portions of the edge and front walls of the body, means passing through the front wall portion of said closure and the front wall of said body and securing the closure and body together with said closure in closing relation with the lower end of said body, said body having screened air entrance openings opposite one another in the respective sides of the upper end portion thereof, said body open through its rear side toward its lower end for communication with the air intake of the casing of an internal combustion engine, hook-like lugs rigid with the rear edge of the bottom wall of said closure and depending therefrom for use in mounting the same and the body of the stack on an engine casing, and a rigid bracket fixed with said body and spaced therealong from said hook-like lugs and extending rearwardly from the rear wall thereof.

HENRY J. STEGEMAN.

REFERENCES CITED

The following references are of record in the file of this patent:

UNITED STATES PATENTS

| Number | Name | Date |
| --- | --- | --- |
| 1,306,421 | Feltz | June 10, 1919 |
| 1,331,649 | Kettering | Feb. 24, 1920 |
| 1,646,757 | Masury et al. | Oct. 25, 1927 |
| 1,660,079 | Mack | Feb. 21, 1928 |
| 2,172,992 | Stegeman | Sept. 12, 1939 |
| 2,254,927 | Archambeau | Sept. 2, 1941 |
| 2,445,965 | Packwood | July 27, 1948 |